(No Model.)  4 Sheets—Sheet 3.
H. G. MORRIS & P. G. SALOM.
ELECTRICALLY PROPELLED VEHICLE.
No. 603,198.  Patented Apr. 26, 1898.
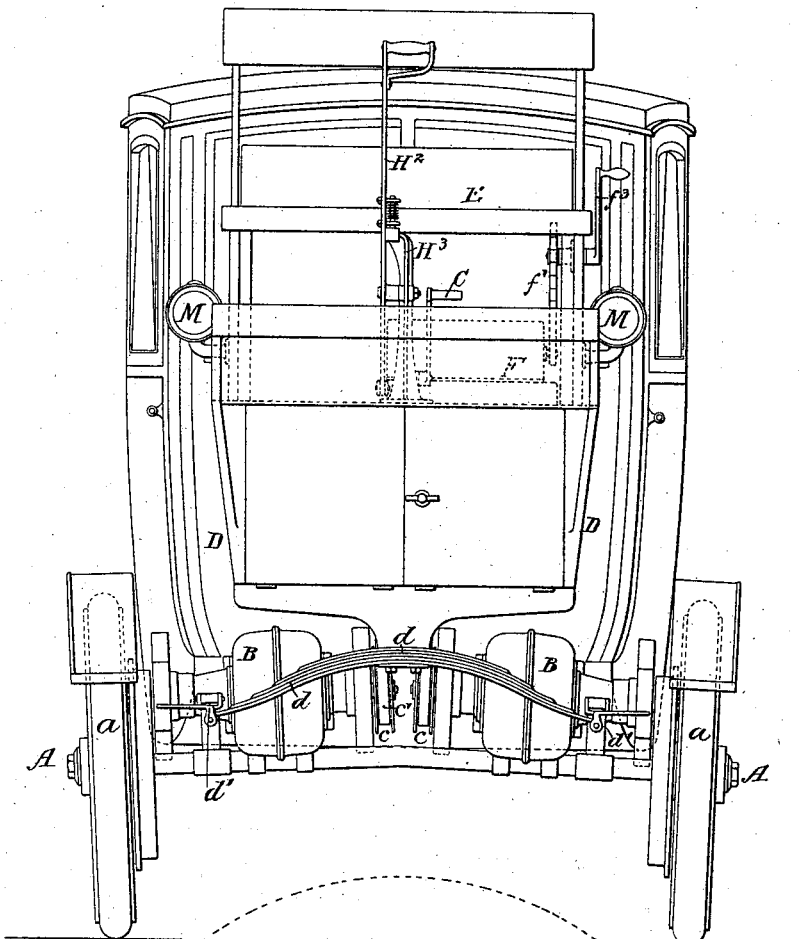
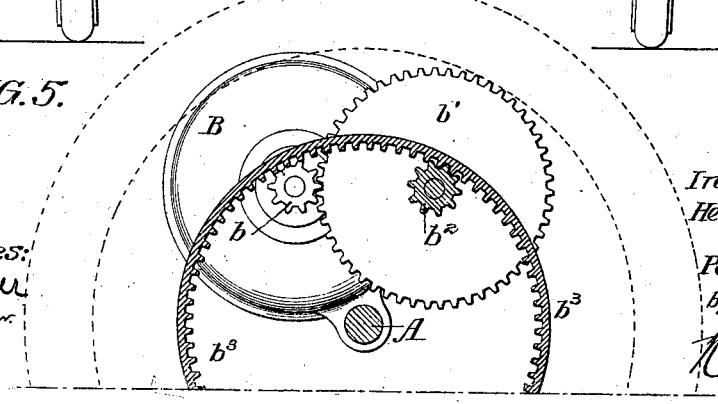

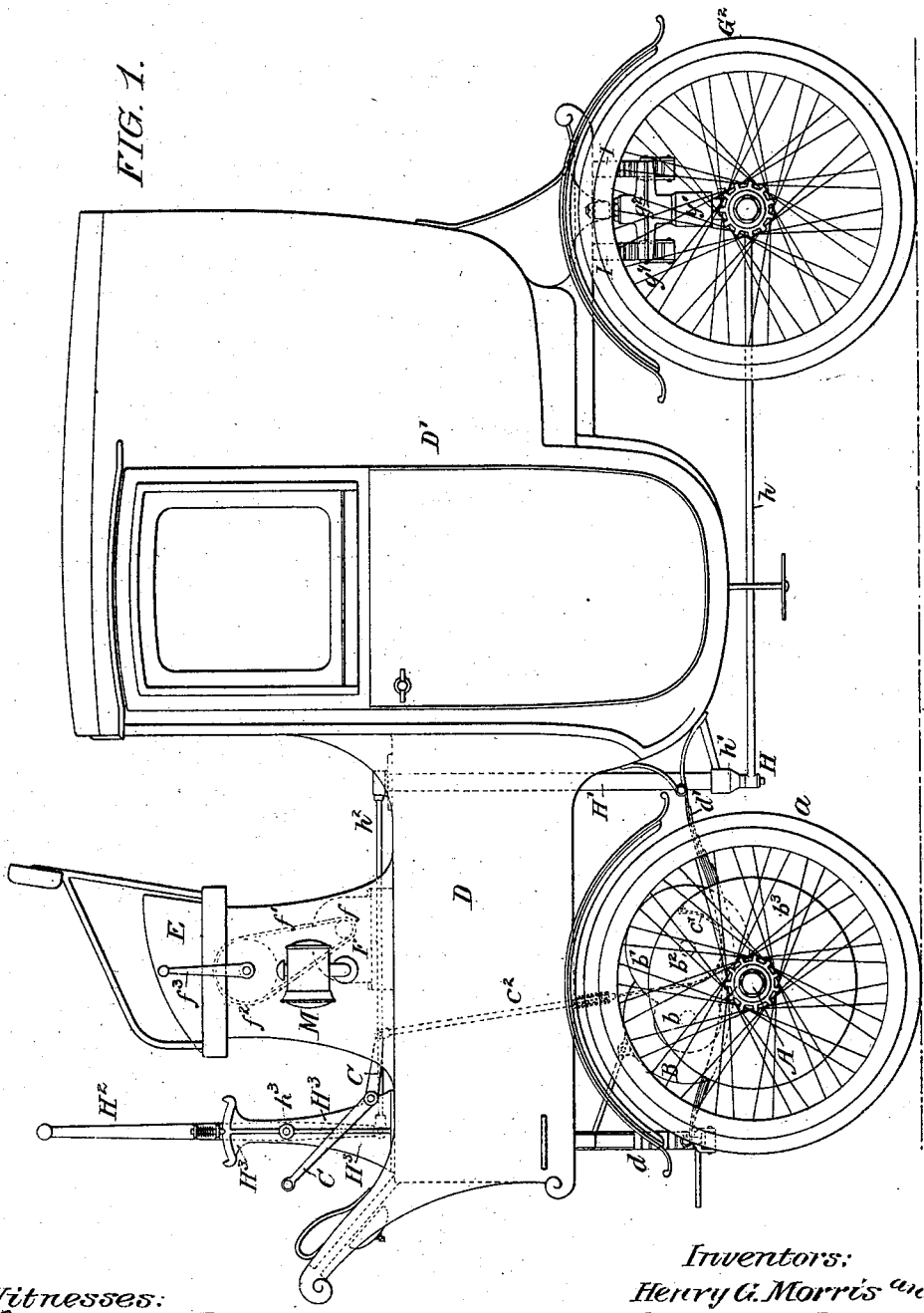

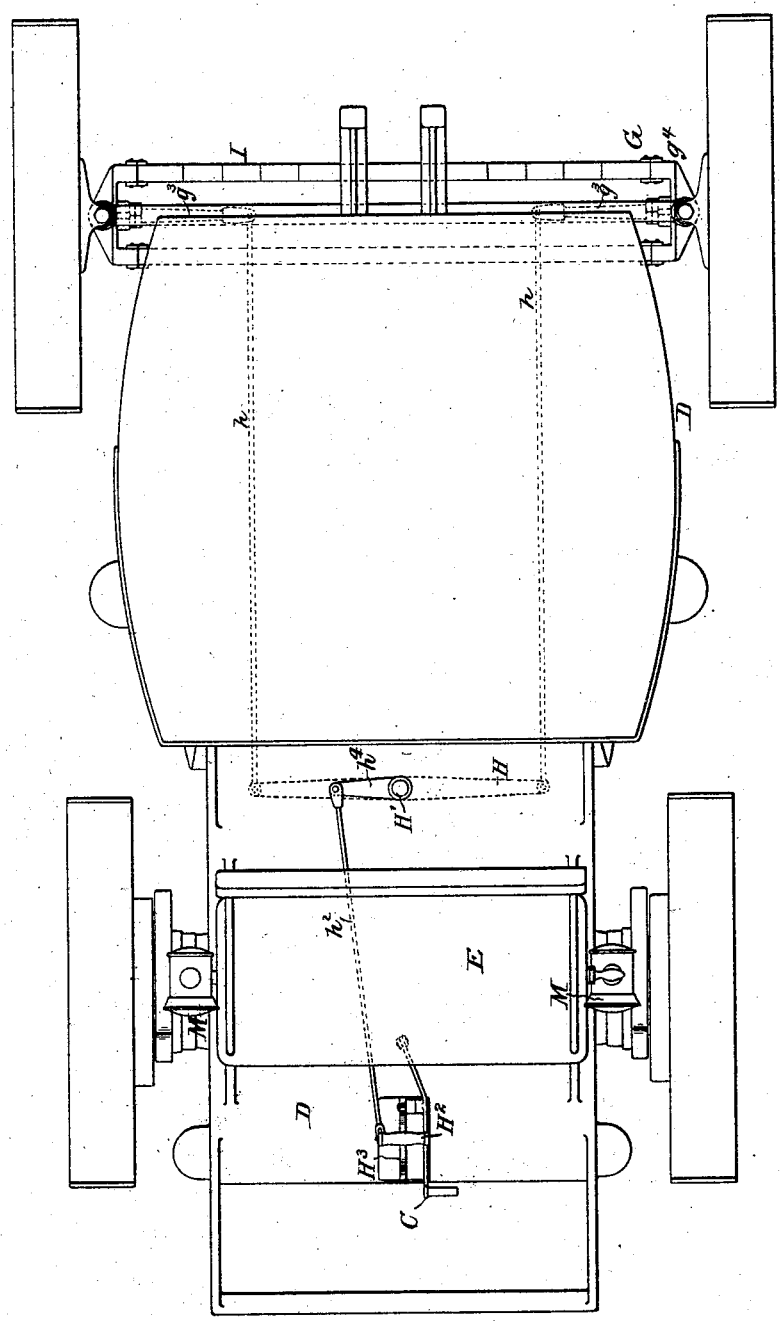

(No Model.) 4 Sheets—Sheet 4.

H. G. MORRIS & P. G. SALOM.
ELECTRICALLY PROPELLED VEHICLE.

No. 603,198. Patented Apr. 26, 1898.

Witnesses:
Inventors:
Henry G. Morris and
Pedro G. Salom
by their Attorneys

UNITED STATES PATENT OFFICE.

HENRY G. MORRIS AND PEDRO G. SALOM, OF PHILADELPHIA, PENNSYLVANIA.

ELECTRICALLY-PROPELLED VEHICLE.

SPECIFICATION forming part of Letters Patent No. 603,198, dated April 26, 1898.

Application filed September 29, 1896. Serial No. 607,346. (No model.)

*To all whom it may concern:*

Be it known that we, HENRY G. MORRIS and PEDRO G. SALOM, citizens of the United States, and residents of Philadelphia, Pennsylvania, have invented certain Improvements in Electrically-Propelled Vehicles, of which the following is a specification.

The object of our invention is to so construct an electrically-propelled vehicle that the motor and batteries will be carried by the front wheels, so that any form of body can be attached thereto and carried by the rear wheels.

Figure 4:
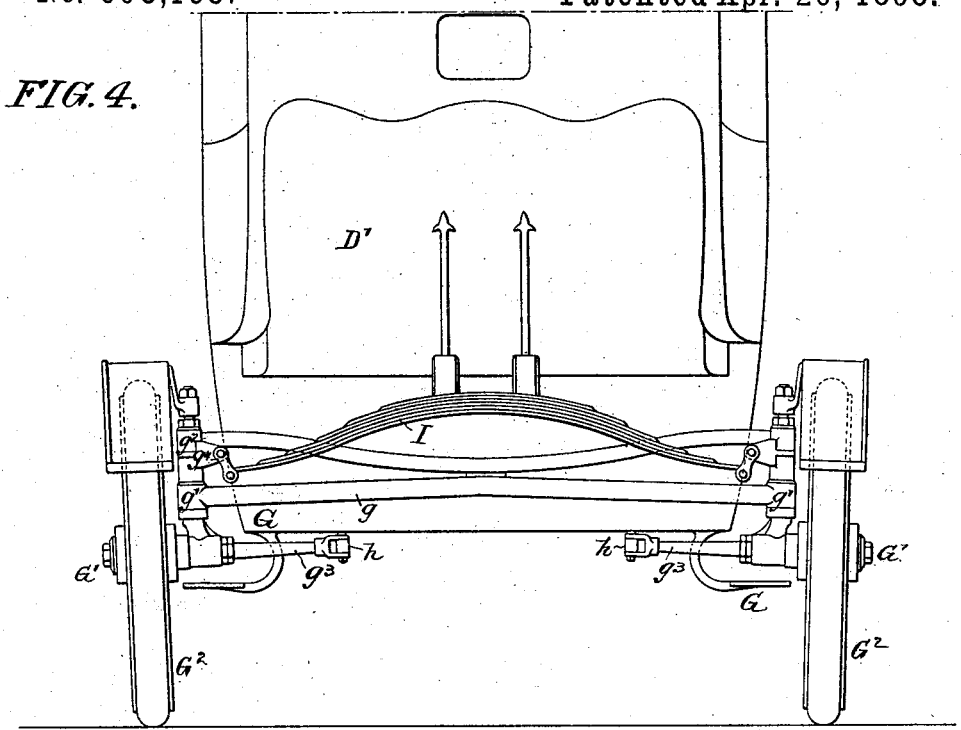
Figure 6:
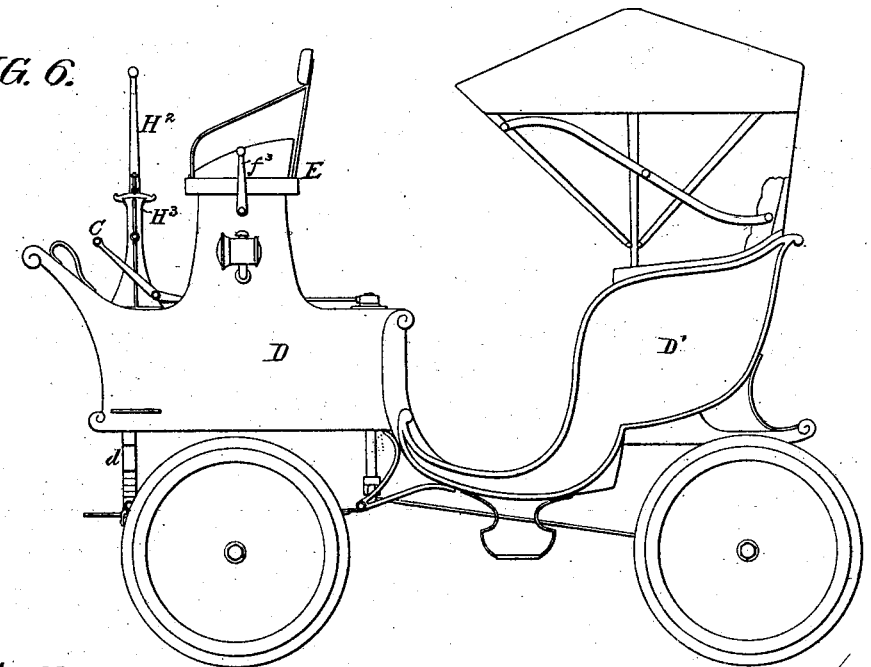

In the accompanying drawings, Figure 1 is a side view of a coupé made in accordance with our invention. Fig. 2 is a plan view. Fig. 3 is a front view. Fig. 4 is a rear view. Fig. 5 is a diagram of the gearing, and Fig. 6 is a view showing our invention applied to a different style of carriage.

Heretofore in the manufacture of electric carriages in which batteries are used the battery-box was supported by the front and rear trucks, so that the entire carriage had to be designed with special reference to the battery-box and motors. By our invention we mount all the mechanism on the front truck and can attach thereto a body portion either in the form of a coupé, landau, barouche, or any form of wagon-body without disturbing the design of the driving parts of the apparatus.

A is the front axle of the vehicle, on which are mounted the driving-wheels $a\ a$. B are two motors mounted on said axle. These motors are coupled independently to the batteries, and each motor is geared through a train of gearing to the driving-wheels, in the present instance through the gearing $b\ b'\ b^2\ b^3$. The gear $b^3$ is an internal gear secured in any manner to the driving-wheel. It will be understood that any form of gearing may be used to couple the motors to the driving-wheels. The motors in the present instance have straps $b^4$, by which they are secured to the axle, and tie-rods $b^5$ couple the motors to the forward portion of the running-gear, so as to keep them in a fixed position.

In the present instance on each motor-shaft is a brake-drum $c$, to which is adapted a brake-shoe $c'$, connected by a rod $c^2$ to the brake-lever C within easy reach of the operator, so that instead of applying the brakes to the rims of the wheels we apply the brakes directly to the motor-shaft.

D is the forward structure, containing the batteries. This structure is mounted above the front axle, in the present instance on transverse springs $d$, which are connected to side springs $d'$. The springs $d'$ are mounted upon the axle A, and their rear ends are connected to the carriage-body. On this forward structure is the seat E for the operator.

In the present instance the box D has suitable doors at the front, so that the storage batteries can be placed in position within the box without interfering with either the operator's seat or the main body of the vehicle.

Under the operator's seat is the controller F. The drum of this controller has a wheel $f$, around which passes an endless chain $f'$. Mounted on a shaft adapted to bearings under the operator's seat is a wheel $f^2$, around which the chain passes, and on this shaft is an operating-arm $f^3$ in easy reach of the operator, so that by moving the arm the electric motors can be controlled.

Trailing from the forward structure D and mounted on the rear axle or truck is a vehicle-body D', in the present instance being in the form of a coupé-body having a single seat-section and side doors. This body is connected to the forward structure at $d^2$.

It will thus be seen that there are short connections between the batteries and the controller and between the controller and the motors, and no matter what style of carriage or wagon is used the invention can be readily applied and the parts will always bear the same relation to each other.

The main body of the carriage may be of different designs and may have two or more seats or may be designed as a delivery-wagon without changing the arrangement of the forward parts alluded to above.

G is the rear-truck frame, having the cross-bar $g$, brace $g^2$, and vertical bearings $g'$, to which are adapted the vertical studs projecting from the short rear axles G', on which are mounted the rear wheels $G^2$.

Projecting from the rear of the short axles are arms $g^3$, each arm being connected by a rod $h$ to a two-armed lever H, situated near the front of the vehicle and mounted on the vertical shaft H', having its bearings in the present instance in the box-section D of the carriage-body and also in a bracket h', projecting from the main body portion. On the upper end of this shaft H' is an arm h⁴, connected by a rod h² to one arm of the steering-lever H², pivoted at h³ to a stand H³, mounted on the box in front of the operator's seat, so that on moving this lever in one direction or the other the wheels can be shifted to turn the vehicle.

Projecting from each side of each bearing g' are brackets g⁴, to which are hung the springs I, which support the rear of the body portion D of the vehicle.

At each side of the operator's seat are lamp-casings M M, having incandescent lamps connected to the storage batteries, so that they can be lighted by simply switching on the current.

We claim as our invention—

1. The combination in an electrically-propelled vehicle, of a front axle, motor mounted thereon, a forward structure forming part of the vehicle-body and located directly above the front axle and carrying the battery, a rear axle, a carriage or wagon body trailing from the front structure and mounted upon the rear axle, substantially as described.

2. The combination in an electrically-propelled vehicle, of a front axle, its wheels, a motor mounted on the front axle, a rear axle, wheels thereon, a battery-carrying structure located directly above the front axle, a body mounted upon the rear axle and connected to the said battery-carrying structure, the motors being geared to the front wheels, and steering mechanism connected to the rear wheels, substantially as described.

3. The combination in an electrically-propelled vehicle, of a front axle, two independent wheels thereon, two motors on the axle, one motor geared to one wheel and the other motor geared to the other wheel, a rear axle, wheels thereon, a battery-carrying structure mounted above the front axle and motors carried thereby, and a body attached to the said structure and supported by the rear axle, with steering mechanism, substantially as described.

4. The combination in an electrically-propelled vehicle, of a front axle, its wheels, motors on the front axle, one motor geared to one wheel and the other motor geared to the other wheel, springs mounted on the axle, a battery-holding structure mounted above the front axle and supported by the springs, a rear axle and its wheels, springs carried thereby and a body attached to the battery-carrying structure and mounted on the springs of the rear axle, substantially as described.

5. The combination in an electrically-propelled vehicle, of a front axle, its wheels, an internal gear mounted on each wheel, two motors mounted on the front axle and having pinions, the pinion of one motor geared to the internal gear of one wheel and the pinion of the other motor geared to the internal gear of the other wheel, springs on the front axle, a battery-carrying structure mounted on the springs directly over the front axle so that the front wheels will sustain the weight thereof, a rear axle and its wheels and a body attached to the battery-carrying structure at its forward end and carried at the rear by the rear axle, substantially as described.

In testimony whereof we have signed our names to this specification in the presence of two subscribing witnesses.

HENRY G. MORRIS.
PEDRO G. SALOM.

Witnesses:
WILL. A. BARR,
JOS. H. KLEIN.